United States Patent [19]

Handy et al.

[11] Patent Number: 4,832,204
[45] Date of Patent: May 23, 1989

[54] PACKAGE HANDLING AND SORTING SYSTEM

[75] Inventors: Steven W. Handy, Pittsburgh; E. Roger Everman, Wexford; Gordon N. Bloom; Bram B. Johnson, both of Sewickley, all of Pa.

[73] Assignee: Roadway Package System, Inc., Coraopolis, Pa.

[21] Appl. No.: 884,610

[22] Filed: Jul. 11, 1986

[51] Int. Cl.⁴ .............................................. B07C 3/00
[52] U.S. Cl. ..................................... 209/3.3; 209/554; 209/564; 209/583; 209/698; 235/385; 340/825.35; 364/478
[58] Field of Search .................................. 209/3.1-3.3, 209/555, 556, 558, 563-566, 569, 583, 584, 698, 900, 912, 924, 925, 942, 546; 340/825.35; 198/365; 235/375, 383, 385; 364/478, 401, 403; 414/136, 270, 398, 786

[56] References Cited

U.S. PATENT DOCUMENTS

| | | | |
|---|---|---|---|
| 3,086,121 | 4/1963 | Cockrell | 209/583 X |
| 3,167,192 | 1/1965 | Harrison et al. | 198/365 X |
| 3,233,720 | 2/1966 | Atanasoff et al. | 198/365 |
| 3,286,811 | 11/1966 | McWilliams | 198/365 |
| 3,327,836 | 6/1967 | Burt | 198/365 |
| 3,563,395 | 2/1971 | Gary | 414/136 |
| 3,645,391 | 2/1972 | Hirakawa et al. | 209/3.3 |
| 3,908,113 | 9/1975 | Maxham et al. | 235/385 X |
| 3,977,513 | 8/1976 | Rushforth | 198/365 |
| 4,058,217 | 11/1977 | Vaughan et al. | 414/136 X |
| 4,336,589 | 6/1982 | Smith et al. | 364/478 X |
| 4,340,810 | 7/1982 | Glass | 235/385 X |
| 4,588,881 | 5/1986 | Pejas et al. | 235/385 |
| 4,651,150 | 3/1987 | Katz et al. | 235/385 X |
| 4,656,591 | 4/1987 | Goldberg | 364/478 |

FOREIGN PATENT DOCUMENTS

| | | | |
|---|---|---|---|
| 54-17258 | 2/1979 | Japan | 209/583 |
| 2097330 | 11/1982 | United Kingdom | 209/584 |

Primary Examiner—Robert B. Reeves
Assistant Examiner—Edward M. Wacyra
Attorney, Agent, or Firm—Oldham & Oldham Co.

[57] ABSTRACT

The invention relates to a package handling and sorting system which sorts small packages according to destination, segregating those with the same destinations for combined shipments. The system depends on a unique combination of conveying equipment automatically controlled by programmed data processing units which utilize data obtained by scanning electronically readable package labels, as well as other information and detection equipment, to examine packages introduced into the system, and to transfer those consigned to the same location to vehicles routed to such locations. The system also generates an electronic trail of package movements, thus providing the capability to trace packages lost in transit.

6 Claims, 4 Drawing Sheets

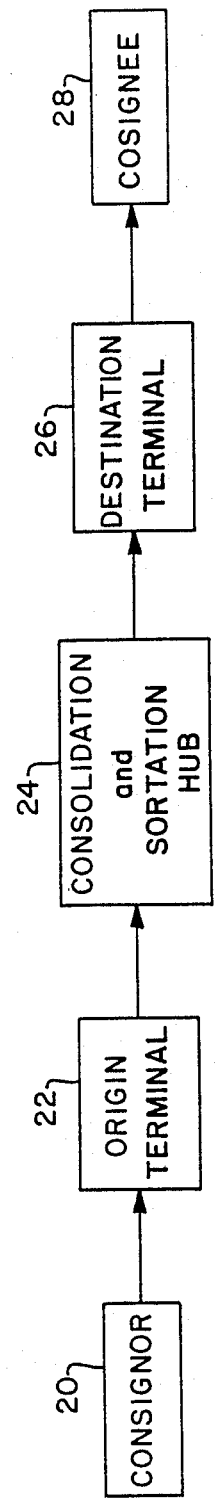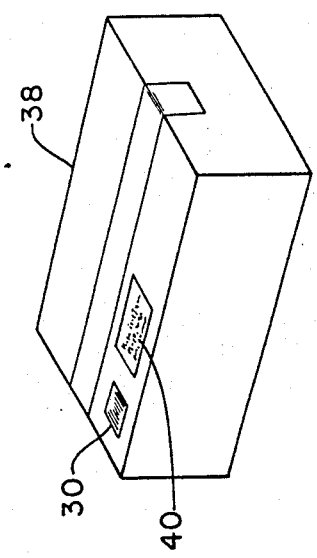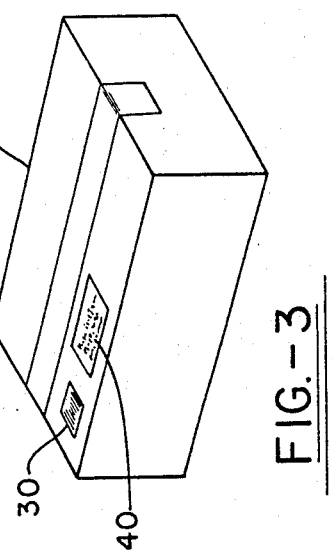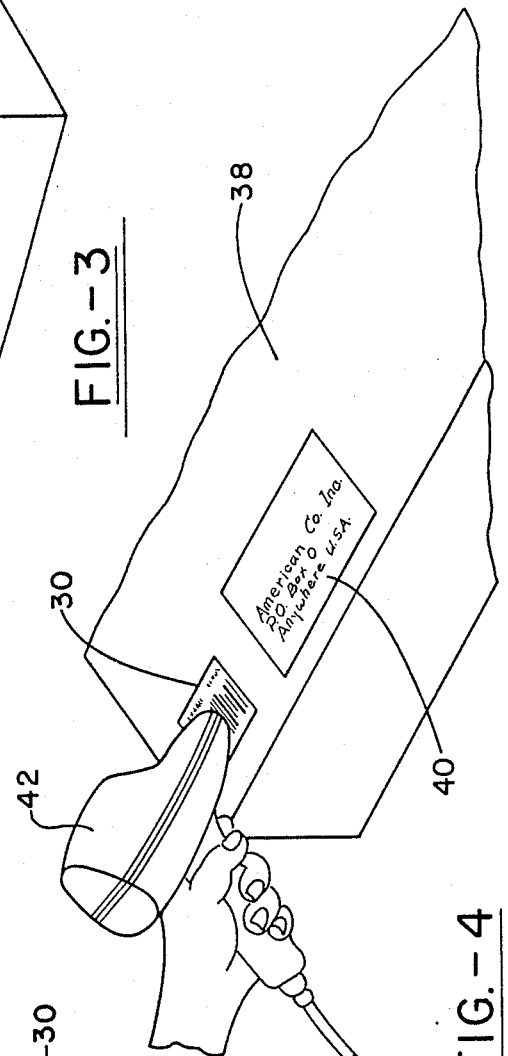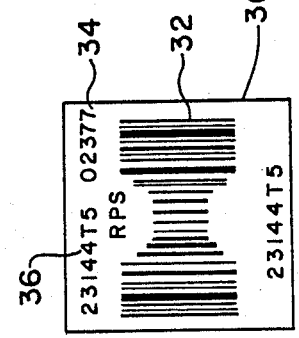

PACKAGE HANDLING AND SORTING SYSTEM

This invention relates to a system for collecting freight from multiple pickup points, obtaining and processing relevant information concerning it, and delivering the freight to a variety of predetermined destinations.

More particularly, this invention relates to a small package delivery system involving the collection of identified small packages from shippers situated at different locations, sorting such small packages at multiple central points, processing the small packages in a manner such that information regarding their nature and destination is determined, combining small packages with common destination areas, and arranging transportation of such packages to their respective destinations.

Specifically, this invention relates to an electromechanical small package shipping system which entails collecting such packages from their various points of origin, which packages have affixed to them optically scannable bar code labels containing shipper information, and marshalling the packages at a central processing point where the affixed information is optically scanned. Information thus obtained, together with other information obtained from an address label, a package pick-up report, and address correction information, is directed through electronic data processing units which use the information to direct a mechanical sorting array that manages the packages, including sorting them according to destination areas. The data processing units also compile retrievable information data regarding the packages processed up to the time at which they are delivered to their various points of destination.

TECHNICAL FIELD

The transportation of freight of one kind or another is the keystone of commerce. Indeed, even those not involved in commercial activities frequently have a need to ship items from one location to another. Such needs have given rise to the transportation industry on which the nation's economy depends to an important degree. While systems, and related hardware, have been developed for the cost effective handling of most types of freight, the transportation of smaller items of freight, particularly small packages, that is, those weighing about one hundred pounds or less, remains a vexing problem.

On the one hand, the content value of such packages is frequently quite modest; therefore, the amount of money that can be devoted to their handling is correspondingly low.

On the other hand, the cost entailed in transporting small packages is very considerable for a variety of reasons.

Commonly, the collection of such packages involves pickups from consignors at numerous points of origin, and deliveries to consignees at diverse destinations. Furthermore, information regarding each package, for example, the identity of the consignor and the consignee, the package weight, its destination and the like, must be recorded, a time consuming and labor intensive process. Because such packages are small, it is highly desirable, if not mandatory, to sort the packages in order to identify those having common destination areas so that they can be transported in a single vehicle, for example, a truck. Furthermore, since they are relatively small, it is difficult to avoid inadvertently misplacing the packages in the transit process, and correspondingly difficult to locate them in the system once misplaced. An additional problem is presented by the need to maintain accurate, current records covering the multitude of packages handled. The voluminous records required for large numbers of packages can only be maintained by the use of modern data processing equipment.

BACKGROUND ART

In the past, the transportation of small packages has, to a large degree, involved a relatively high content of non-automated operations, including for instance, the manual transcription and recording of information regarding the package's consignor and consignee, its origin and destination, package weight, the correct shipping rate and similar information. In addition, the transportation of small packages has required considerable physical manipulation of the packages themselves, involving such operations as hand sorting based on information read from shipping labels, a separate weighing operation, manual transfer of the packages to the trucks used for their shipment and so forth. In addition, the creation of shipment records, billing documents and the like has had a significant amount of manual procedures connected therewith.

While the older methods can be used, they frequently entail costs so disproportionate to the value of the package shipped as to be cost ineffective. Furthermore, even in those instances when excessive costs can be absorbed, manual systems tend to be prone to error both in the physical transfer of the packages, and in the records which their movement generates. Equally objectionable is the voluminous paper trail required to assure adequate records of their transit, and the difficulty involved in tracing the movement and whereabouts of a particular package at any given time.

DISCLOSURE OF THE INVENTION

In light of the foregoing, a first aspect of this invention is to provide a system capable of processing the transfer of small package freight in which the packages are to a large extent untouched by human hands in the transfer process.

A further aspect of this invention is to furnish a system in which information concerning the packages is incorporated into a barcode label, which together with computer data, in effect serves as a transit program director which governs physical transfer of the packages.

A still further aspect of the invention is the provision of an automated package handling system, the operation of which is controlled by electronic data processing units utilizing data bases appropriate for the packages being handled.

An additional aspect of the invention involves provision of an automated package handling system capable of electronically acquiring information about a package from a barcode label affixed to the package being processed, and based on such information and additional information from electronic data bases, mechanically sorting such packages according to their destination areas and transferring them to appropriate vehicles for transportation to such areas and ultimately to the consignees.

Another aspect of this invention is to provide an electronic record and optionally, hard copies of the transit history of packages handled, for file generation, billing, tracing and similar purposes The foregoing and other aspects of the invention which will become apparent as the detailed description proceeds are achieved by a process for sorting packages in the course of transfer from their points of origin to their points of destination comprising the steps of:

affixing a barcode label and a label which includes a postal zip code to the package;

optically scanning the information encoded in the barcode label, weighing the package, reading the postal zip code information, and incorporating such package information into an electronic information network;

routing said package information electronically to the appropriate tilt tray sorter system in a package distribution network;

transporting the package to said tilt tray sorter system and sorting it in said system, said tilt tray sorter system being provided with electronic data processing units having operative control over mechanical and electromechanical components within said system which direct the segregation of packages with common area destinations so that such packages can be transferred to their common destination together, said control being exercised based upon said package information, together with scanning and detection information obtained from scanning and detection devices forming part of the tilt tray sorter system, and upon file information from an electronic sortation routing file, and providing data from said tilt tray sorter system to other electronic data processing units after the packages have been sorted, to enable identification of package movements for tracing purposes.

Other aspects of the invention are attainable with a package sorting system device suitable for sorting packages according to destination comprising in combination:

package induction means;
detection and scanning means;
electronic data processing controller units;
an endless conveyor chain carousel;
tray means mounted on said conveyor chain carousel;
tray tip means;
package discharge means located adjacent said tray tip means, and
vehicle loading means.

BRIEF DESCRIPTION OF THE DRAWINGS

This invention will be better understood when reference is had to the accompanying drawings forming a part hereof in which:

FIG. 1 is a process flow diagram showing movement of the packages during processing according to the invention disclosed;

FIG. 2 shows a barcode label of the invention;

FIG. 3 is illustrative of a package prepared for processing by the invention;

FIG. 4 shows a package being processed according to the invention undergoing scanning;

BEST MODE FOR CARRYING OUT THE INVENTION

Figure 5:
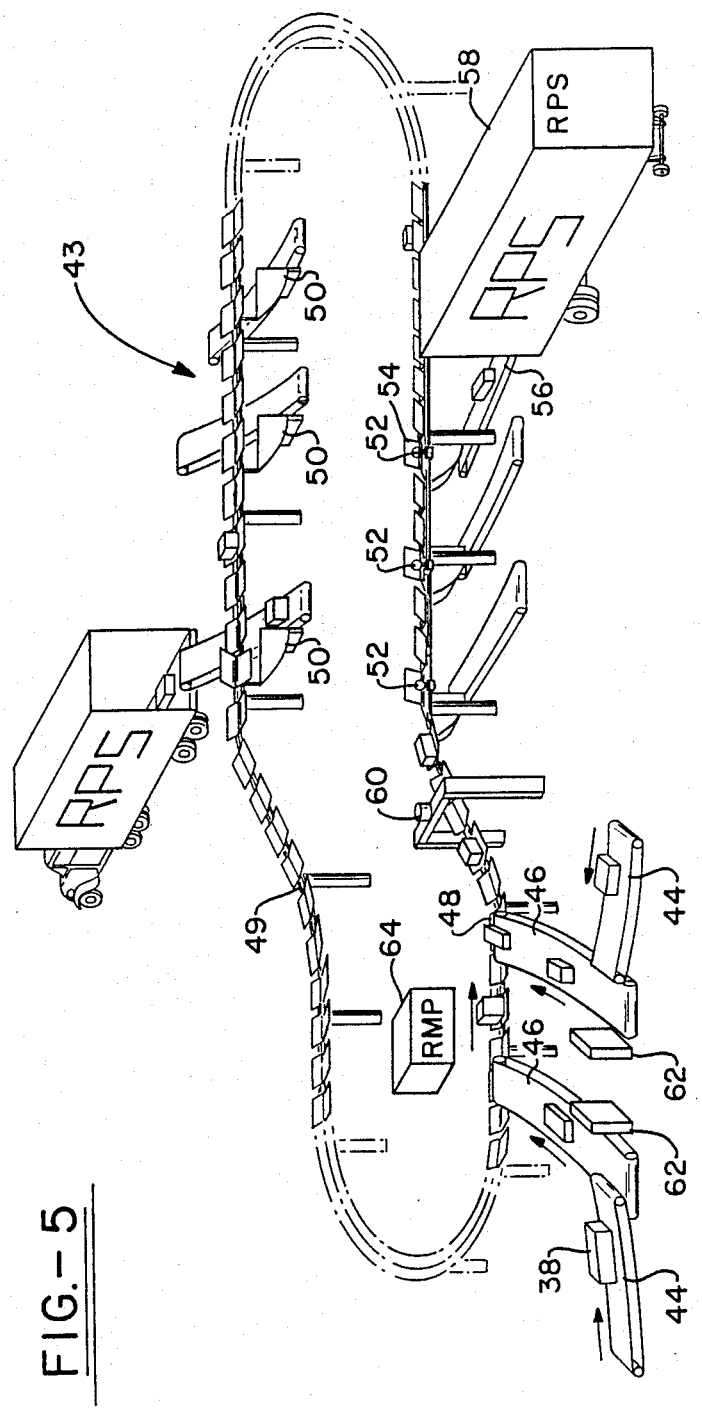
FIG. 5 represents a semi-schematic, pictorial diagram of the sortation process of the invention.

FIG. 1 is a process flow diagram showing the movement of packages during processing by the system of integrated components of the invention in which an individual or organization wishing to ship a small package, the consignor 20, affixes a specially coded label and an address label, as described hereinafter, to the package, and either delivers the package to a central collection point or origin terminal 22 or its equivalent, or requests the system operator to pick up the package and deliver it to the origin terminal. The origin terminal 22 is the system operator's freight terminal, or when the package originates in the vicinity of a consolidation and sortation center, or "hub" 24, the latter location can serve as the collection point.

At origin terminal 22, the label information is retrieved, and together with other information regarding the package gathered at the origin terminal, and from the pick-up report, is fed into the system's electronic information network. Next, the package is forwarded by truck to the system operator's hub location 24, where the information in the system's information network, together with still further information regarding the package obtained at the hub is used to direct electromechanical handling equipment which sorts the packages being transferred through the hub on the basis of their respective destinations. Those having common areas of destination are segregated for transfer to such areas as a group. Package information accumulated during the sorting process is also incorporated into the system's information network.

Such common destination area packages are then transferred to a delivery point destination terminal such as another freight terminal 26, or its equivalent which may be another hub in the destination area. At the destination terminal 26, the package is delivered to the consignee 28 by truck or picked up by him, with information regarding the delivery process also being incorporated into the system's information network.

FIG. 2 shows a barcode label 30 of the type used to identify packages being processed according to the invention. As the name suggests, the barcode label 30 is printed wit a series of parallel lines 32, some broader than others, arranged in a coded sequence, which designates both the consignor and the package serial number so that the package can be identified throughout the handling process. The barcode label 30 is capable of transmitting its information in two ways. The first method and of primary importance for purposes of the invention, comprises optical transmission by means of a scanning process utilizing a laser emitting device, or sometimes ordinary light, the laser or light striking the bars and being reflected by them to a detection device. The latter device converts the pattern of reflections to intelligible electronic impulses which are fed to an electronic signal processing device such as a computer, capable of translating the code.

The barcode label 30 also carries at least one group of visually readable numbers 34, which identify the package serial number, and the consignor 36.

FIG. 3 shows a package 38 prepared for shipment utilizing the process and components of the invention. The barcode label 30 has, for example, been adhesively fastened to the package 38, as has been an address label 40 which includes thereon a postal zip code.

Prospective consignors intending to utilize the package handling system of the invention are assigned an identification number and supplied with barcode labels 30 which contain such number in the barcode on the labels. The barcode on each of the barcode labels 00 also includes one of a sequence of identifying package numbers. The consignor affixes one of the barcode labels 30 issued to him to the package to be shipped, and at the same time fastens an address label 40 which shows the consignee's address, including particularly the consignee's postal zip code.

The package is then delivered to the origin terminal 22 or directly to the hub 24 for further processing.

FIG. 4 shows a package 38 with barcode label 30 and address label 40 attached thereto being scanned by a hand-held laser scan device 42. In the package handling system contemplated by the invention, upon initial receipt at the origin terminal 22, a package 38 is placed on a conveyor belt where it is subjected to a laser scan of the barcode label 30 to determine the package's identification number. The address label is read, the destination code is keyed into the information network, while the weight of the package is ascertained as it moves over a scale, the weight data also being added to the system's electronic information network. The procedure described, referred to as a SWAK, i.e., scan, weigh and key operation, may be performed at the origin terminal 22, or at hub 24 in those instances when the package initially enters the system at a hub location.

FIG. 5 is a semi-schematic, pictorial diagram showing the concept of the sortation operation as practiced at hub 24 in the process of the invention. Direction of movement in the Figure is shown by means of arrows adjacent to the components illustrated. At the hub, packages received are inducted into a tilt tray sorter system 43 for segregation according to destination area. In the induction process the packages 38 are transferred from the truck in which they are received at the hub 24 to an induction conveyor system which includes a feed conveyor 44 and an induction conveyor 46. The incoming packages 38 are placed on the feed conveyor 44, barcode label 30 side up, which delivers them onto the induction conveyor 46 from which the packages 38 are loaded directly onto tilt trays 48. The tilt trays are continuously carried on an endless conveyor chain carousel 49 past package discharge chutes 50 located around the carousel, specific chutes corresponding to specific destination areas. When a particular package is carried to a point adjacent to a chute 50 corresponding to its destination area, a solenoid operated tip device 52 is activated, causing the tray 48 to tip as shown at 54, discharging the package 38 into the chute 50. Chute 50 transfers the package 38 by gravity to truck transit loading conveyor 56 which carries it to a truck 58 routed to the destination area of the package.

The mechanical operations attendant to the sortation operation are controlled by a sortation management system. The sortation management system includes as primary components an overhead package scanner 60, a sortation control system, SCS, unit 62; a real-time management processor, RMP 64, and various accessory package detection devices such as photo electric sensors, not shown.

In the control process, the SCS unit 62, a microprocessor, begins its control function at the package induction process. With information received from photoelectric sensors, the SCS determines the size of a particular package 38 on the induction conveyor 46 and decides whether the package will require a single tilt tray 48, or two adjacent tilt trays. The SCS coordinates such need with the availability of empty trays, temporarily stopping induction conveyor 46, as well as feed conveyor 44, until the requisite empty tray or trays 48 arrive at the discharge point of the induction conveyor. After loading, the tray 48 and a package 38 with bar code label facing up on it, pass beneath an overhead scanner 60 which identifies the package from its barcode label and relays the information to the RMP 64, another microprocessor. The RMP notifies the SCS as to the destination area of the package 38, and when the tilt tray 48 arrives at a point adjacent to a discharge chute 50 corresponding to the package's area destination, the SCS activates the solenoid tip device 52 at the chute, discharging the package 38 into it. Confirmation of the tip, and therefore of the truck assignment, is relayed back to the RMP 64 through the SCS 62.

It is to be appreciated that the configuration of the tilt tray sorter system 43 shown is for illustrative purposes only. The path of the carousel conveyor chain may be altered to accomodate the needs of the system operator. Similarly, the design of the induction system, e.g., the number of conveyor belt lines, discharge points, locations and so forth may all be altered, depending on such things as the volume of packages to be handled, the nature of the building in which the system is to be housed, as well as similar and different considerations.

Figure 6:
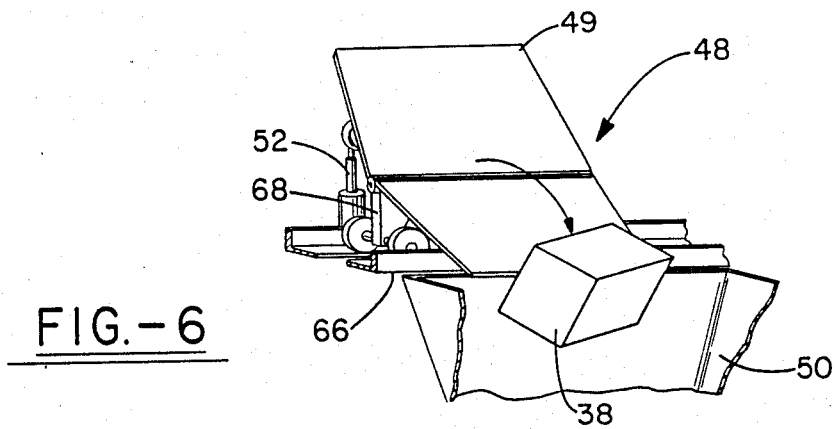
FIG. 6 shows a package tilt tray of the invention in the process of being tipped.

FIG. 6 shows an essentially schematic view of a tilt tray of the package handling system of the invention. In the Figure, a tilt tray 48 is shown attached to, and being moved along the conveyor chain assembly 66. The tray component 49 rests on, and is pivotally attached by means of pins to a wheel mounted carriage assembly 68, the latter in turn being attached to the conveyor chain. In the unloading process, the solenoid operated tip device 52 is electrically activated, causing it to push against one side of the tray component 49, pivoting it up from a substantially horizontal position to a tipped position, resulting in dislodgement of package 38 into chute 50.

The mechanical details of the tilt tray carriage assembly and its method of pivotal attachment to the package tray may vary within engineering design parameters and principles embodying the novel tilt tray concept; consequently the tray and carriage are illustrated broadly in conceptual fashion.

Figure 7:
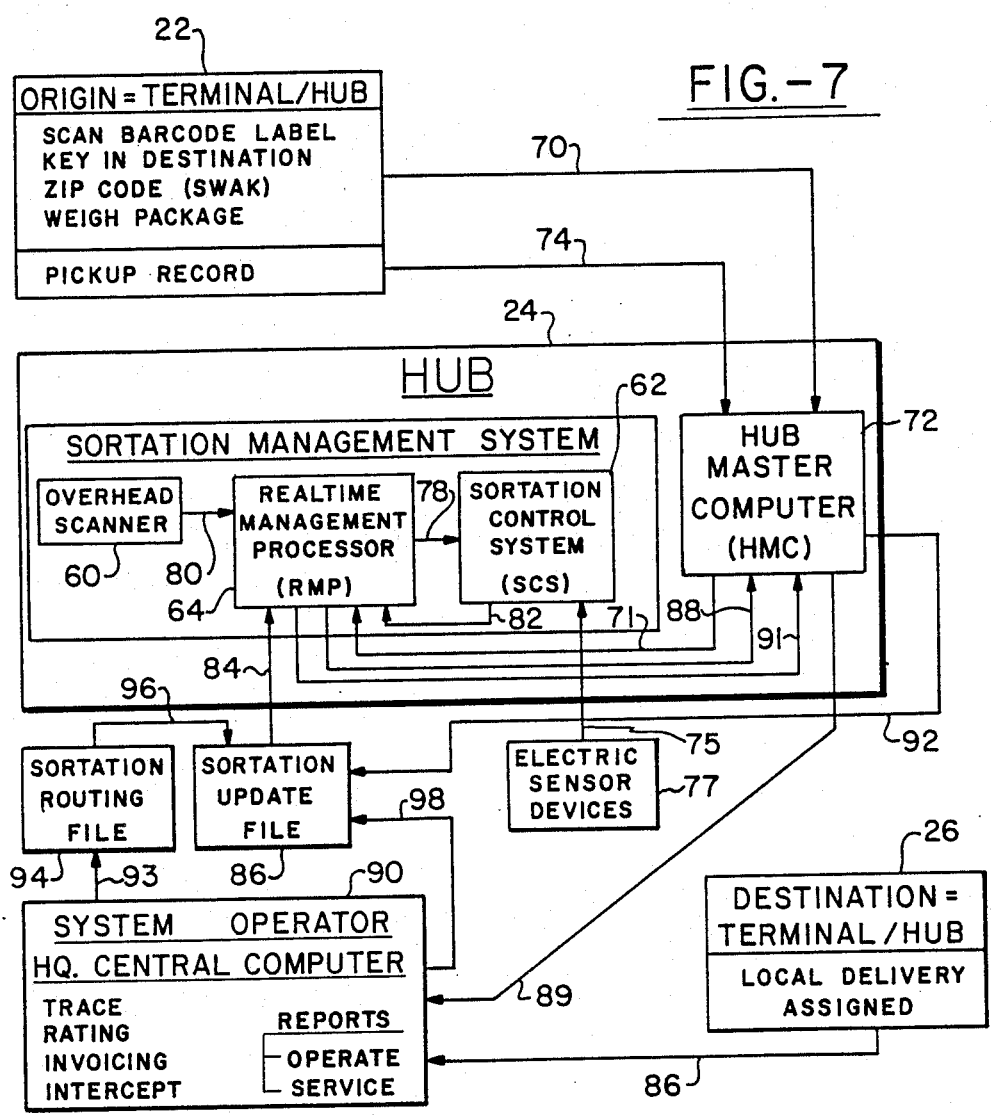
FIG. 7 is an algorithm showing the novel system of linking data acquisition, electronic data processing equipment, and package handling equipment as taught by the invention.

FIG. 7 is an algorithm designed to show the electronic information network of the invention, its interface with system control components, and functional details relating to the information transmitted. In the figure, which assumes a package 38 originates at an origin terminal 22, SWAK information 70, comprising the identity of the package 38, its destination, zip code, and weight are generated at origin 22 and transmitted over the system's interconnecting electronic network, shown by lines pointed in the direction of information flow, to a master computer, HMC, 72 located at the hub 24 prior to physical sort of the package. The HMC 72 in turn transmits the SWAK information 70 to the RMP 64, as shown at 71. In those instances in which the package 38 originates at a hub, the SWAK information 70 is sent directly to both the HMC 72 and to the RMP 64.

The pick-up record 74, also containing details of the package and generated by the consignor at the time the package was delivered to the system operator, is likewise forwarded to the hub HMC 72 for comparison with the SWAK data. In instances when for some reason master computer 72 is off-line or otherwise unavailable for the transmission of data to it, SWAK information is held in the SWAK unit at origin terminal 22 until the master computer 72 is back on line.

The SCS 62 directs the induction and processing of the package based on information received by it from electric sensor devices 77 located at various points throughout the tray sorter system of FIG. 5 and on information 78 obtained from the RMP 64. Such direction includes controlling the starting and stopping of conveyor lines, tilt tray loading and tipping, and related activities.

The RMP 64 receives information 80 relating package identity to the tilt tray carrying it from the overhead scanner 60. The RMP 64 is also informed 82 by the SCS 62 of the fact that a package tip has occurred and as to the identity of the chute 50 where the tip has occured, the RMP making the association of the chute with the truck assigned to carry the package 38, based on information known to the RMP. In addition, the RMP 64 receives information 84 as to package destination from the package handling system's electronic sortation update file 86.

The HMC 72 is provided with information 88 known by the RMP. Information known to the HMC 72 is transmitted 89 to the headquarters central computer 90 of the system operator, the point at which, and based upon the information received, package intercepts and tracing occur, and where operating and service reports are generated. The central computer 90 also receives information 87 regarding delivery of packages to destination 26 and their ultimate delivery to the consignee.

The HMC 72 receives information 91 regarding packages seen by the system from the RMP 64, and transmits information 92 regarding packages 38, including those having destinations in the vicinity of hub 24 to the sortation update electronic file 86. The sortation update file 86 receives additional information 96 regarding the identity and destination of packages 38 from electronic sortation routing file 94, which includes a routing data base relating postal zip codes to geographical location, as well as information concerning the system operator's terminal and hub locations, and other route information, the latter file having previously received data 93 regarding the packages' identification and destination zip codes from the central computer 90.

At the conclusion of the physical sort, the central computer 90 can be used for tracing packages, since it contains all relevant package information, including the last detected movement of the package, its trailer assignment, and so forth.

The electronic information network described may be modified with respect to routing, redundancy and similar details so long as the fundamental concept of providing the components of the system with the information required to allow them to perform their intended function in the package handling system is preserved.

Figure 8:
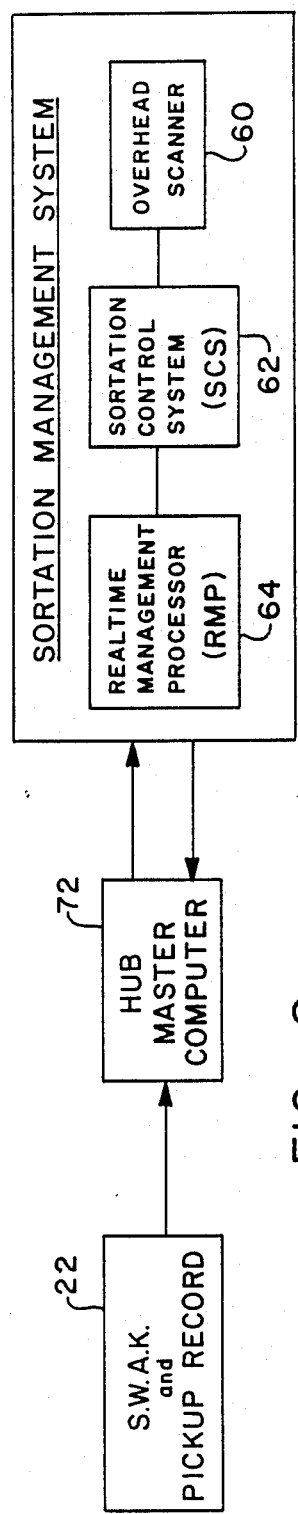
FIG. 8 is a simplified block diagram showing the flow of information between the SWAK operation, the hub computer, and the sortation management system.
Figure 9:
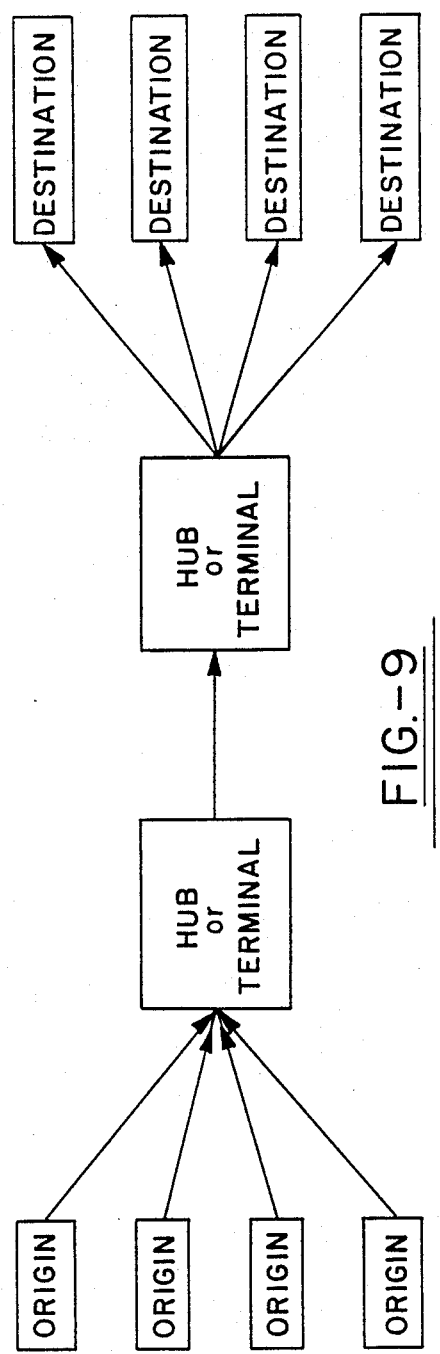
FIG. 9 is a block diagram showing transit point relationships.

FIGS. 8 and 9, show a more generalized block diagram form of the overall algorithm of FIG. 7, and the pattern of package movements. The Figures are believed to be self explanatory, in the light of the other figures and the explanations contained herein.

While in accordance with the patent statutes the best known embodiment of this invention has been described in detail, it is to be understood that the invention is not limited thereto or thereby, but that the scope of the invention is defined in the appended claims.

What is claimed is:

1. An integrated package transfer process which involves the steps of (1) transferring bar code and address label identified packages through a successive of sorting terminals where said packages are sorted in a tilt tray sorter system that segregates packages assigned to the same geographic location based on information obtained from said labels, (2) moving packages consigned to the same geographic location between said terminals in unitized loads, (3) periodically scanning said labels in each of said terminal as said packages pass through the terminals en route to a consignee and (4) using information obtained by such periodic scanning to control said tilt tray sorter system and said segregation, and also transferring said information to a central computer so that the location of the packages can be instantly determined.

2. A process according to claim 1 in which said tilt tray sorter system comprises:
   package induction means;
   an endless conveyor chain carousel;
   detection and scanning means;
   electronic data processing controller units;
   tray means mounted on said conveyor chain carousel;
   tray tip means;
   package discharge means located adjacent said tray tip means, and
   vehicle loading means.

3. A process according to claim 2 in which said tray means mounted on said carousel comprises a tilt tray having a tray component pivotally attached to a wheel mounted carriage assembly, said wheel mounted carriage assembly being attached to and moved by said conveyor chain carousel, said tray components having the capability of being pivoted from a substantially horizontal position to an angled package discharge position when a force is applied to one side of said tray component.

4. A process according to claim 2 in which said package induction means comprises a feed conveyor and an induction conveyor, said feed conveyor receiving packages into the tilt tray sorter system and discharging said packages onto said induction conveyor which deposits them onto tilt trays, said package induction means being controlled by an electronic microprocessor which receives signals from tray sorter system detection means capable of determining when empty trays are available for package loading, said electronic microprocessor starting and stopping said feed conveyors and induction conveyors as required to control package movement during the loading process.

5. A process according to claim 2 in which the tray tip means comprises a solenoid operated device.

6. A process according to claim 2 in which the package discharge means comprises a discharge chute moving packages introduced therein by gravity, and wherein said endless conveyor chain carousel is located on a level above said vehicle loading means.

* * * * *